(12) United States Patent
Zhang et al.

(10) Patent No.: US 9,423,659 B2
(45) Date of Patent: Aug. 23, 2016

(54) ARRAY SUBSTRATE, LIQUID CRYSTAL DISPLAY PANEL, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Honglin Zhang, Beijing (CN); Hebin Zhao, Beijing (CN); Sha Liu, Beijing (CN); Dan Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 125 days.

(21) Appl. No.: 14/371,319

(22) PCT Filed: Jun. 21, 2013

(86) PCT No.: PCT/CN2013/077692
§ 371 (c)(1),
(2) Date: Jul. 9, 2014

(87) PCT Pub. No.: WO2014/166166
PCT Pub. Date: Oct. 16, 2014

(65) Prior Publication Data
US 2016/0048063 A1 Feb. 18, 2016

(30) Foreign Application Priority Data
Apr. 12, 2013 (CN) .......................... 2013 1 0127323

(51) Int. Cl.
G02F 1/1343 (2006.01)
G02F 1/1337 (2006.01)
G02F 1/1333 (2006.01)

(52) U.S. Cl.
CPC ..... *G02F 1/134363* (2013.01); *G02F 1/13439* (2013.01); *G02F 1/133345* (2013.01); *G02F 1/133707* (2013.01); *G02F 2001/134318* (2013.01)

(58) Field of Classification Search
CPC ................ G02F 1/134336; G02F 1/133707; G02F 1/1393; G02F 1/134309; G02F 1/134363; G02F 2001/134345; G02F 1/136213; G02F 1/136286; G02F 2001/134372
USPC ........................................ 349/141, 146, 144
See application file for complete search history.

(56) References Cited

U.S. PATENT DOCUMENTS

| | | | |
|---|---|---|---|
| 6,459,464 B1 | 10/2002 | Nakasima et al. | |
| 2006/0146253 A1* | 7/2006 | Kang | G02F 1/133784 349/141 |

(Continued)

FOREIGN PATENT DOCUMENTS

| | | |
|---|---|---|
| CN | 1797146 A | 7/2006 |
| CN | 10276102 A | 10/2008 |

(Continued)

OTHER PUBLICATIONS

First Office Action of the State Intellectual Property Office of the People's Republic of China for Chinese Application No. 201310127323.2, dated Mar. 20, 2015; 5 pgs.

(Continued)

*Primary Examiner* — Mike Qi
(74) *Attorney, Agent, or Firm* — Ladas & Parry LLP

(57) ABSTRACT

An array substrate, a liquid crystal display panel (20) and a display device. The array substrate comprises: a substrate (10); a first transparent conductive layer (11) disposed on the substrate (10); an insulating layer (12) disposed on the first conductive layer (11); and a second transparent conductive layer (13) disposed on the insulating layer (20) and configured for forming a horizontal electric field with the first transparent conductive layer (11); the second conductive layer (13) comprises a plurality of transparent electrodes (14), adjacent transparent electrodes (14) possess a slit structure therebetween, and two ends of each transparent electrode each possess a bent structure (16).

12 Claims, 2 Drawing Sheets

(56) References Cited

U.S. PATENT DOCUMENTS

2009/0009671 A1    1/2009  Wakabayashi
2009/0296037 A1   12/2009  Tanaka et al.
2011/0149186 A1    6/2011  Song et al.
2014/0167274 A1    6/2014  Want et al.

FOREIGN PATENT DOCUMENTS

CN    101592813 A   12/2009
CN    102103295 A    6/2011
CN    102629040 A    8/2012
JP    2009025639 A   2/2009

OTHER PUBLICATIONS

English translation of First Office Action of the State Intellectual Property Office of the People's Republic of China for Chinese Application No. 201310127323.2, dated Mar. 20, 2015; 3 pgs.
PCT International Search Report, dated Jan. 9, 2014; 11 pgs.
English language Abstract of CN1797146A; 2 pgs.
English language Abstract of CN102629040A; 1 pg.
English language Abstract of CN101276102A; 1 pg.
English language Abstract of CN101592813A; 1 pg.
English language Abstract of CN102103295A; 1 pg.
English language Abstract of JP2009025639A; 1 pg.
International Preliminary Report on Patentability Appln. No. PCT/CN2013/077692; Dated Oct. 13, 2015.

* cited by examiner

US 9,423,659 B2

ARRAY SUBSTRATE, LIQUID CRYSTAL DISPLAY PANEL, AND DISPLAY DEVICE

CROSS REFERENCE TO RELATED APPLICATIONS

This application is based on International Application No. PCT/CN2013/077692 filed on Jun. 21, 2013, which claims priority to Chinese National Application No. 201310127323.2 filed on Apr. 12, 2013. The entire contents of each and every foregoing application are incorporated herein by reference.

TECHNICAL FIELD

Embodiments of the present invention relate to an array substrate, a liquid crystal display panel and a display device.

BACKGROUND

Among flat plate display devices, thin film transistor liquid crystal display (TFT-LCD) possesses the characteristics such as small volume, low power consumption, relatively low manufacturing cost, no radiation and so on, and takes a leading position in the present flat plate display market. At present, the display modes of TFT-LCD mainly comprise twisted nematic (TN) mode, vertical alignment (VA) mode, in-plane switching (IPS) mode, and advanced super dimension switch (AD-SDS or ADS) mode, etc.

The ADS mode involves a planar electric field wide viewing angle core technology, i.e., ADvanced Super Dimension Switch, the core technical features of which can be described as: forming a multiple dimension electric filed by an electric field generated by edges of slit electrodes in a plane and an electric filed generated by a slit electrode layer and a plate electrode layer to make the liquid crystal molecules of all orientations between the slit electrodes and right above the electrodes in a liquid crystal cell be able to undergo rotation, so as to improve the work efficiency of liquid crystal and increase the light-transmitting efficiency. Advanced super dimension switch technology can improve the image quality of a TFT-LCD product, and makes it be capable of the advantages such as high resolution, high transmitting ratio, low power consumption, wide viewing angle, high opening ratio, low color shift, no push mura and so on. With regard to different applications, the improved technologies of ADS technology comprise I-ADS technology with high transmitting ratio, H-ADS technology with high opening ratio, and S-ADS with high resolution, etc.

FIG. 1 is a top view of an existing array substrate; as illustrated in FIG. 1, the existing array substrate in an ADS mode is provided with gate lines 31 and data lines 30, and the adjacent gate lines 31 and data lines 30 define sub-pixel regions; each sub-pixel region is provided therein with a thin film transistor (TFT), a strip common electrode 32, and a pixel electrode 33, and the common electrode 32 and the pixel electrode 33 are provided with an insulating layer (which is not shown in the top view) therebetween. When a voltage is not applied, the common electrode 32 and the pixel electrode 33 have no electric filed therebetween, and liquid crystal molecules 34 between the array substrate and a color filter substrate do not undergo deflection; when a voltage is applied, the common electrode 32 and the pixel electrode 33 form a horizontal electric field therebetween, and the liquid crystal molecules 34 undergo deflection along the direction of the electric field, so as to realize a high light-transmitting efficiency in the case of wide viewing angle.

The defects of the existing technology lie in that, as illustrated in FIG. 2, which is a display effect diagram, because liquid crystal molecules in a pixel unit in a liquid crystal display panel 20 of an ADS mode are affected by the lateral electric field of the data line, the liquid crystal molecules at the edge of the pixel unit produce an irregular arrangement; when the liquid crystal display panel is under the action of a foreign force (finger press/finger scratch, etc), the liquid crystal molecules in the irregular arrangement at the edge of the pixel unit will drive the arrangement of the liquid crystal molecules at the portions with relatively weak electric field in the pixel region to change, which eventually brings the phenomenon that the press trace or scratch trace on the liquid crystal display panel does not disappear.

SUMMARY

An embodiment of the present invention provides an array substrate, which comprises: a substrate; a first transparent conductive layer on the substrate; an insulating layer disposed on the first conductive layer; and a second transparent conductive layer disposed on the insulating layer and configured for forming a horizontal electric filed with the first transparent conductive layer; the second transparent conductive layer comprises a plurality of transparent electrodes, the adjacent transparent electrodes possess a slit structure therebetween, and two ends of each transparent electrode each comprise a bent structure.

Another embodiment of the present invention provides a liquid crystal display panel, which comprises the above array substrate.

Another embodiment of the present invention provides a display device, which comprises the above array substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

Drawing reference numbers.

10—substrate; 11—first transparent conductive layer; 12—insulating layer; 13—second transparent conductive layer; 14—transparent electrode; 15—slit structure; 16—bent structure; 20—liquid crystal display panel; 21—dark line; 30—data line; 31—gate line; 32—common electrode; 33—pixel electrode; 34—liquid crystal molecules.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In order to improve the display effect of a liquid crystal display panel, embodiments of the present invention provide an array substrate, a liquid crystal display panel, and a display device. In technical solutions of the present invention, bent structures are provided at the two ends of a transparent electrode to make the electric fields at the two ends of the transparent electrode and the electric field at the middle portion thereof form a strength-weakness complementing relationship with each other, which prevents the influence on the liquid crystal molecules by the lateral electric field produced by the data line, so that the display effect of the liquid crystal display panel is improved.

Figure 1:
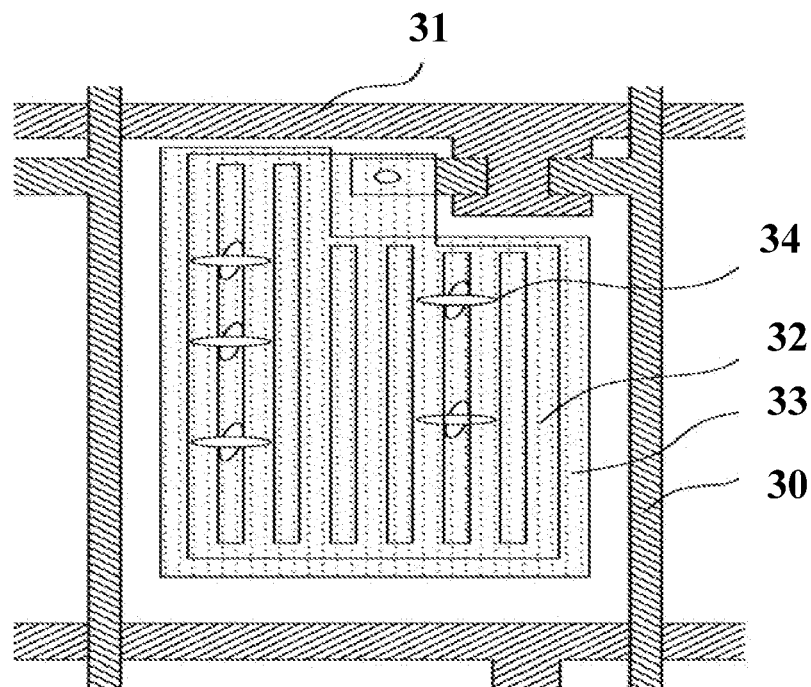
FIG. 1 is a top view of an array substrate in a prior art.
Figure 2:
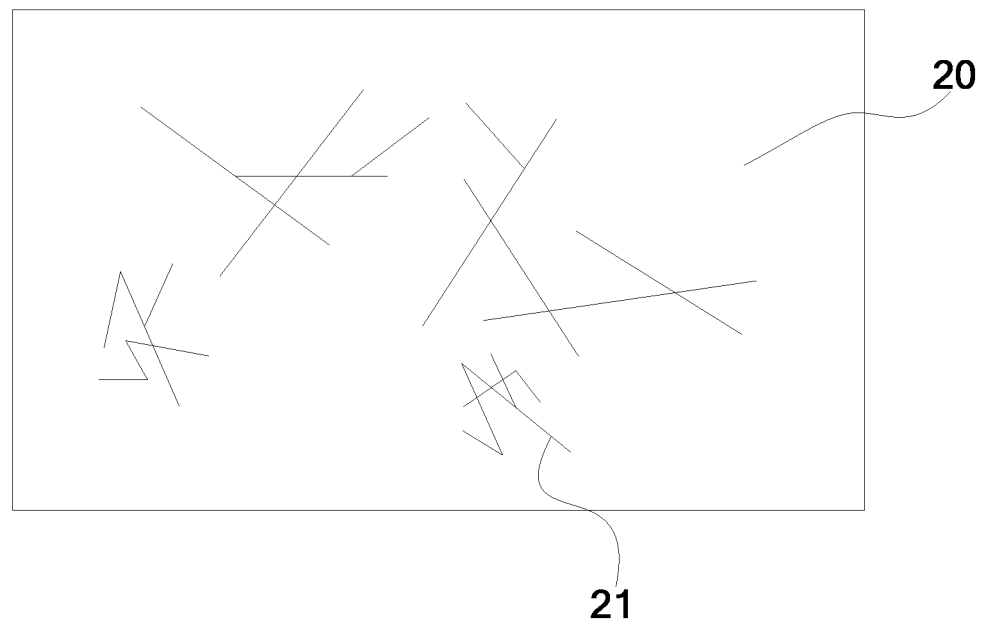
FIG. 2 is a display effect diagram of a liquid crystal display panel of the prior art.
Figure 3:
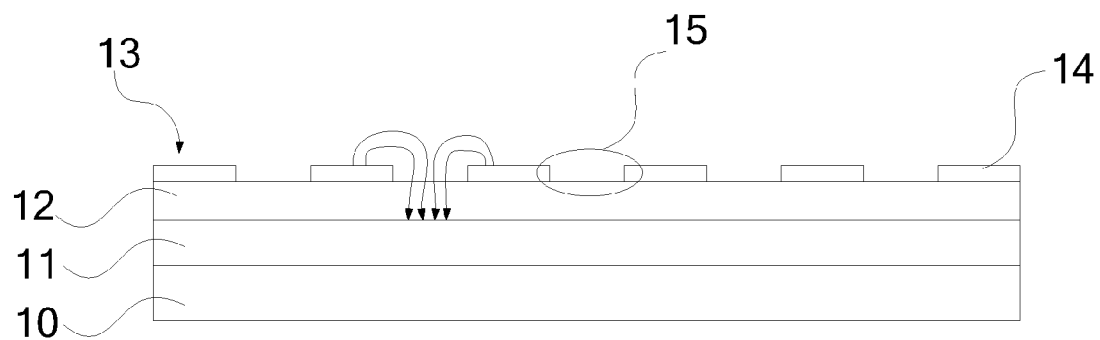
FIG. 3 is a structural schematic diagram of the array substrate provided by an embodiment of the present invention.
Figure 4:
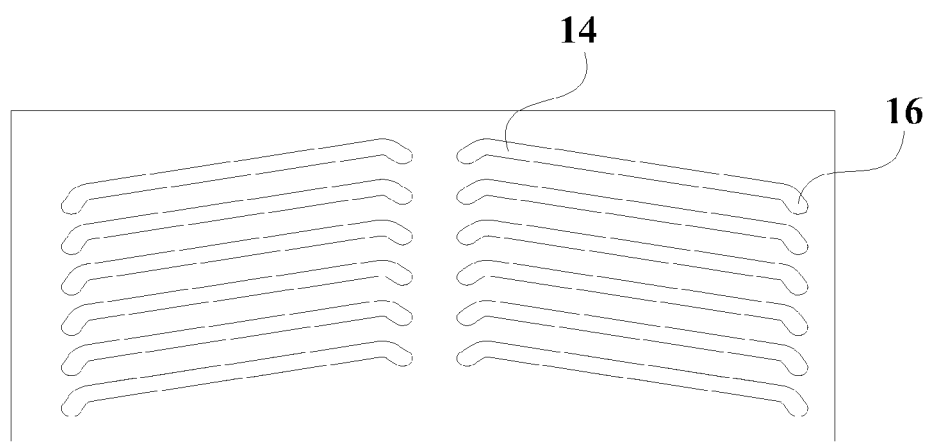
FIG. 4 is a structural schematic diagram of the bent structures of the ends of the transparent electrodes.

As illustrated in FIG. 3 and FIG. 4, FIG. 3 is a structural schematic diagram of the array substrate provided by an embodiment of the present invention; FIG. 4 is a structural schematic diagram of the bent structures at the ends of the transparent electrodes.

An embodiment of the present invention provides an array substrate, which comprises: a substrate 10; a first transparent conductive layer 11 disposed on the substrate 10; an insulating layer 12 disposed on the first conductive layer 11; and a second transparent conductive layer 13 disposed on the insulating layer 12 and forming a horizontal electric field with the first transparent conductive layer 11. The second transparent conductive layer 13 comprises a plurality of transparent electrodes 14, the adjacent transparent electrodes 14 possess a slit structure 15 therebetween, and two ends of each transparent electrode 14 each comprise a bent structure 16.

Hereinafter, the work principle of the array substrate provided by an embodiment of the present invention in a liquid crystal display panel when displaying an image will be described.

When the array substrate is energized to work, the second transparent conductive layer 13 and the first transparent conductive layer 11 form a horizontal electric field between the slit structure 15, making the liquid crystal molecules disposed on the array substrate undergo deflection in the horizontal electric field; when energized, the data line disposed on the array substrate generates a lateral electric field as well, affecting the deflection of the liquid crystal molecules at the edge of a pixel unit, and at this time, the horizontal electric filed formed by the added bent structures 16 and the first transparent conductive layer 11 and an electric field at the middle portion form a strength-weakness complementing relationship with each other; the position with a relatively stronger electric field in the edge bent region and the position with a relatively weaker electric field in the normal display region are located on a horizontal line, preventing the influence on the liquid crystal molecules in the normal display region by the lateral electric field generated by the data line and make the liquid crystal molecules maintain a conforming deflections, so that the light-transmitting ratio of the liquid crystal molecules across the whole liquid crystal layer can be maintained in consistency.

In the array substrate provided by an embodiment of the present invention, a horizontal electric filed formed by the added bent structures 16 and the first transparent conductive layer 11 and an electric field at the middle portion form a strength-weakness complementing relationship with each other, which offsets the influence on the liquid crystal molecules at the edge of the pixel unit by the lateral electric field formed by the data line, so that it can be guaranteed that the light-transmitting ratio of the liquid crystal molecules across the whole liquid crystal layer is in consistency and the display effect of the liquid crystal display panel is improved.

In the above embodiment, the bent directions of the bent structures 16 at the two ends of the transparent electrodes 14 may be in accordance with each other or chosen to be different; it is only needed to guarantee that the horizontal electric filed formed by the formed bent structures 16 and the first transparent conductive layer 11 can offset the influence on the liquid crystal molecules at the edge of the pixel unit by the lateral electric field formed by the data line. In some embodiments of the present invention, for example, the bent directions of the bent structures 16 of the two ends of the transparent electrodes 14 are same as each other, which facilitates etching of the bent structures 16 during manufacturing of the array substrate.

In the above embodiment, in order to further reduce the influence on the liquid crystal molecules at the edge of the pixel unit by the lateral electric field generated by the data line, for example, when a connection line of the top points of ends of two bent structures 16 of each transparent electrode 14 is located between two adjacent transparent electrodes 14, the connection line is a central line of the slit structure between the two adjacent transparent electrodes 14; this guarantees that the position with a relative stronger electric field in the bent region and the position with a relatively weaker electric field in the normal display region are located in a same horizontal line, so as to offset the influence on the liquid crystal molecules in the display region by the lateral electric field generated by the data line.

In the above embodiment, a plurality of types can be selected for the arrangement modes of the plurality of the transparent electrodes 14; for example, a plurality of the transparent electrodes 14 present a two-two symmetrical splayed radiation arrangement. In the situation of adopting a symmetrical splayed radiation arrangement, the requirement to the production conditions of the embodiment of the present invention can be reduced to a maximum degree, facilitating the production of the embodiment of the present invention.

In the above embodiment, in order to make the electric field formed by the array substrate more uniform so as to make the deflection directions of the liquid crystal molecules on the array substrate be in consistency, for example, any two of the transparent electrodes 14 have the same width, and any two of the slit structures 15 have the same width. In addition, in the situation of adopting the structure, it is facilitated to form the transparent electrodes 14 by etching when the array substrate is produced.

In the embodiment as illustrated in FIG. 3, the first transparent conductive layer 11 is a pixel electrode, the second transparent conductive layer 13 is a common electrode, and the insulating layer 12 is disposed under the common electrode; in the present embodiment, the common electrodes possess a plurality of slit structures 15, and two ends of each single electrode of the common electrodes each possess a bent structure 16.

In another embodiment of the present invention, the first transparent conductive layer 11 is a common electrode, the second transparent conductive layer 13 is a pixel electrode, the insulating layer 12 is under the pixel electrode, then in the present embodiment, the pixel electrodes possess a plurality of slit structures 15, and two ends of the single electrode of the pixel electrodes each possess a bent structure 16.

An embodiment of the present invention further provides a liquid crystal display panel, which comprises any one of the above array substrates and a liquid crystal layer disposed on the array substrate. In the liquid crystal display panel provided by the embodiment of the present invention, a horizontal electric filed formed by the added bent structures 16 and the first transparent conductive layer 11 and an electric field of the middle portion form a strength-weakness complementing relationship with each other, the position with a relatively stronger electric field in the edge bent region and the position with a relatively weaker electric field in the normal display region are located on a horizontal line, preventing the influence on the liquid crystal molecules in the normal display region by the lateral electric field generated by the data line and make the liquid crystal molecules maintain consistent deflections, making the deflection of the liquid crystal molecules be maintained in consistency, and improving the liquid crystal display panel to have a good display effect.

An embodiment of the present invention further provides a display device, which comprises any one of the above array substrates. In the display device provided by the embodiment of the present invention, a horizontal electric filed formed by the added bent structures 16 and the first transparent conductive layer 11 and an electric field of the middle portion form a strength-weakness complementing relationship with each other, the position with a relatively stronger electric field in the edge bent region and the position with a relatively weaker electric field in the normal display region are located on a horizontal line, so as to prevent the influence on the liquid crystal molecules in the normal display region by the lateral electric field generated by the data line and make the liquid crystal molecules maintain a conforming deflections, make the deflections of the liquid crystal molecules maintain in accordance, and improve the liquid crystal display panel to have a good display effect.

The embodiments above are used to illustrate the technical solutions of the present invention and not limitative to the present invention; although the foregoing embodiments illustrate the present invention in detail, one skilled in the art shall understand that: one skilled in the art could amend the technical solutions recorded in the foregoing each embodiment, or replace partial technical features equally; however, those amendments or replacements do not make the substance of the corresponding technical solutions go out the scope and the spirit of the technical solutions of each embodiment of the present invention.

The invention claimed is:

1. An array substrate, comprising:
   a substrate;
   a first transparent conductive layer disposed on the substrate;
   an insulating layer disposed on the first conductive layer; and
   a second transparent conductive layer disposed on the insulating layer and configured for forming a horizontal electric field with the first transparent conductive layer;
   wherein the second transparent conductive layer comprises a plurality of transparent electrodes, adjacent transparent electrodes possess a slit structure therebetween, and two ends of each transparent electrode each possess a bent structure;
   wherein bent directions of the bent structures at two ends of the transparent electrodes are same, a connection line of top points of two bent structure ends of each transparent electrode is located between two adjacent transparent electrodes and the connection line is a central line of a slit structure between the two adjacent transparent electrodes.

2. The array substrate of claim 1, wherein any two of the transparent electrodes have a same width, and any two of slit structures have a same width.

3. The array substrate of claim 2, wherein the first transparent conductive layer is a pixel electrode, and the second transparent conductive layer is a common electrode.

4. The array substrate of claim 2, wherein the first transparent conductive layer is a common electrode, and the second transparent conductive layer is a pixel electrode.

5. The array substrate of claim 2, wherein a plurality of the transparent electrodes present a two-two symmetrical splayed radiation arrangement.

6. The array substrate of claim 1, wherein a plurality of the transparent electrodes present a two-two symmetrical splayed radiation arrangement.

7. The array substrate of claim 6, wherein the first transparent conductive layer is a pixel electrode, and the second transparent conductive layer is a common electrode.

8. The array substrate as claimed by claim 7, wherein an orthographic projection, on the pixel electrode, of the common electrode is located within the pixel electrode.

9. The array substrate of claim 6, wherein the first transparent conductive layer is a common electrode, and the second transparent conductive layer is a pixel electrode.

10. The array substrate as claimed by claim 9, wherein an orthographic projection, on the common electrode, of the pixel electrode is located within the common electrode.

11. A liquid crystal display panel, comprising the array substrate of claim 1.

12. A display device, comprising the array substrate of claim 1.

* * * * *